(12) United States Patent
Chapman et al.

(10) Patent No.: US 6,246,684 B1
(45) Date of Patent: Jun. 12, 2001

(54) METHOD AND APPARATUS FOR RE-ORDERING DATA PACKETS IN A NETWORK ENVIRONMENT (75) Inventors: Alan Stanley John Chapman, Kanata (CA); Hsiang-Tsung Kung, Lexington, MA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/998,347

(22) Filed: Dec. 24, 1997

(51) Int. Cl.$^7$ .................................................. H04L 12/56
(52) U.S. Cl. ......................... 370/394; 370/363; 370/412
(58) Field of Search .................................. 370/394, 428, 370/252, 362, 363, 412

(56) References Cited

U.S. PATENT DOCUMENTS

| | | | | |
|---|---|---|---|---|
| 5,127,000 | * | 6/1992 | Henrion | 370/412 |
| 5,260,935 | * | 11/1993 | Turner | 370/394 |
| 5,383,182 | * | 1/1995 | Therasse et al. | 370/412 |
| 5,461,614 | * | 10/1995 | Lindholm | 370/412 |
| 5,483,521 | * | 1/1996 | Aramaki | 370/394 |
| 5,483,523 | * | 1/1996 | Nederlof | 370/412 |
| 5,491,728 | * | 2/1996 | Verhille et al. | 370/362 |
| 5,577,034 | * | 11/1996 | Petit | 370/412 |
| 5,740,173 | * | 4/1998 | Fiorini | 370/394 |

* cited by examiner

*Primary Examiner*—Chau Nguyen
*Assistant Examiner*—Phuongchau Ba Nguyen

(57) ABSTRACT

The invention provides a method and apparatus for re-ordering data traffic units, such as IP data packets, that may have been miss-ordered during a transmission over a multi-pathway link between a source node and a destination node in a network. The re-ordering apparatus includes a storage medium for intercepting the IP data packets and holding the IP data packets to allow IP data packets delayed on slower pathways to catch-up. The IP data packets in the storage medium are re-ordered based on their sequence number in an attempt to restore the original order of the IP data packets. A maximal time delay variable determines how long a certain IP data packet can be held in the storage medium. The TP data packet is released prior to the maximal time delay variable or as the maximal time delay variable is exceeded.

20 Claims, 8 Drawing Sheets

| Source address | ID number (sequence) | Time of arrival |
|---|---|---|
| xxx.xxx.xxx.xxx | 000001 | YYY |
| xxx.xxx.xxx.xxx | 002346 | YYY |
| xxx.xxx.xxx.xxx | 239811 | YYY |

| Source address | Source ID number | Timestamp | Time of arrival | ID number (sequence) |
|---|---|---|---|---|
| xxx.xxx.xxx.xxx | 00001 | 1010 | YYY | 000100 |
| xxx.xxx.xxx.xxx | 01234 | 350 | YYY | 123456 |
| xxx.xxx.xxx.xxx | 23788 | 20 | YYY | 654321 |

METHOD AND APPARATUS FOR RE-ORDERING DATA PACKETS IN A NETWORK ENVIRONMENT

FIELD OF THE INVENTION

The present invention relates to the field of data communications networks. More specifically, it pertains to devices and methods for re-ordering data traffic units at a destination node.

BACKGROUND OF THE INVENTION

The following paragraphs give definitions of terms used throughout this document.

Physical Link: a single point-to-point (PPP) serial transmission link between two nodes in the network (such as between two routers or between a router and a host machine). The implementation of a serial link may take various forms such as an optical fiber a wavelength segment on an optical fiber among others.

Physical output port: the output port of the router that supports one physical link.

Logical link: A point-to-point traffic path between two routers that is composed of multiple parallel physical links and appears from a routing point of view to be one link.

Logical output port: the collection of physical output ports that support the physical links of a logical link.

Data traffic unit: a portion of the original traffic stream. This may be a complete packet such as an IP data packet, a part of a packet, a collection of packets or an arbitrary number of bytes from the total stream.

Supertrunks: refers to the aggregation of physical links into larger, logical links.

Transmission Control Protocol (TCP): It is a library of routines that applications can use when they need reliable network communications with another computer. TCP is responsible for verifying the correct delivery of data from client to server. It adds support to detect errors or lost data and to trigger reconstruction until the data is correctly and completely received.

Internet Protocol (IP): A library of routines that TCP calls on, but which is also available to applications that do not use TCP. IP is responsible for transporting packets of data from node to node. It forwards each packet based on a four-byte destination address (the IP number).

The traffic on the Internet is growing very fast and soon the traffic rates needed between router pairs will be higher than the serial link transmission technology available. Currently, the highest transmission rate is 9.6 Gb/s, (on a single wavelength) but 2.4 Gb/s is much more commonly available. Purchasers of routers are already demanding 2.4 Gb/s links and it is expected that within a short time, some routes will need multiple physical links.

There are other reasons why multi-link routes are attractive. In situations where routers are clustered in close physical proximity, the use of multiple links might allow the interconnect to be multiple low cost links rather than single high cost connections. Another reason is that the application of the multi-link approach might also be a fast way to provide higher rate ports on existing routers. Yet another reason is that the use of multiple links allows more granularity of growth than the large stops in the transmission network and so may allow savings in bandwidth costs. Finally, another reason is that multiple links can allow for redundancy to cover link failure without requiring the spare link to cover the whole bandwidth of the route.

When using multiple links between two routers, it is a requirement that the total bandwidth be used efficiently. That is to say, the traffic offered must be spread over all available links. This is called load balancing. It would not be acceptable to have one link under utilized while traffic is queued on another. This suggests that packets from any source can be delivered over any link to any destination. In fact, because of the bursting nature of the traffic, allocating links statically to particular sources or destinations would result in inefficient use of the total available bandwidth.

When traffic streams are spread over multiple links, successive packets from a particular flow (for example, a TCP connection between two IP hosts) can travel over different lengths and may arrive at the destination out of order. The variability of delay can be caused by different path lengths or different congestion levels on the paths as well as the normal indeterminacy introduced by queuing and scheduling. The TCP can accommodate some misordering of packets, but there is a problem if too much misordering occurs on a connection where the transmitter is using the fast retransmission protocol. Typically, if a packet stream of A, B, C, D gets misordered such that the destination sees A, C, D, B, then the sender may assume that B was lost when it sees the third acknowledgement for A and will retransmit B. Occasional unnecessary retransmissions are not a problem, but a systematic misordering of packets for very many connections would result in a large drop in the throughput of the network, hence misuse of bandwidth.

Other existing or future applications, or transport protocols may also suffer from packet misordering but the TCP example is the most visible at present.

One of the current solutions to the problems outlined above is to provide multiple routers or additional ports on routers. However, this solution has a serious impact on the efficiency of routing methods used to build routing tables. In fact, more routes to a destination is a less desirable solution than one bigger route.

A load balancing technique, which does not cause packet miss-ordering, has been discussed and is called "Stream Based Load Balancing". In general, the methods rely on choosing a particular link for a traffic stream and using only that link for all its traffic A traffic stream is usually identified by the IP header (source address or source and destination address) and a hash function is used as a quick way to record and retrieve the link designated for traffic with a particular header.

Such methods can distribute traffic streams among links, but there is no prior knowledge of the rate or duration of the stream and, therefore, loads can be distributed quite unfairly. In some cases, a source address can be that of a proxy server which acts on behalf of many host machines and, in other cases, a destination address might be that of a large server which is accessed constantly by a number of source addresses.

Thus, there is a need in the industry to provide a method and a system capable of effecting low cost data traffic unit re-ordering in a network.

OBJECTIVES AND SUMMARY OF THE INVENTION

An object of the present invention is to provide a novel method and apparatus to effect re-ordering of data traffic units transmitted in a network.

As embodied and broadly described herein, the invention provides an apparatus for manipulating data traffic units transmitted in a network to reduce a level of miss-ordering of the data traffic units, said apparatus including:

an input for receiving a stream of data traffic units in a potentially miss-ordered condition;

a re-ordering queue storage medium for receiving the data traffic units, said re-ordering queue storage medium providing means for:

a) altering an order of the data traffic units on a basis of a first recognizable characteristic of each data traffic unit for reducing a level of miss-ordering of the data traffic units;

b) controlling a residence time of each data traffic unit in said reordering queue storage medium;

an output for releasing data traffic units from said re-ordering queue storage medium.

In a most preferred embodiment, the apparatus according to the present invention can be implemented on a router. Such router comprises a plurality of interfaces supporting a number of individual physical links. The router also includes a processor and a memory that contains a program element executed by the processor for regulating the operation of the router. A data bus interconnects the interfaces with the processor and the memory to provide a medium over which data and control signals can be exchanged. The novel feature of the router resides in its ability to re-order data traffic units that have been placed in an out of order condition at some earlier point in the transmission. This miss-ordering may result from individual data traffic units that were originally part of the same data stream, being transported over different pathways that suffer different propagation delays. As a result, when those data traffic units arrive at the router and are combined there, their original order may no longer be maintained. The re-ordering mechanism of the router includes a re-ordering queue storage medium in the form of a buffer in which are placed the data traffic units to be processed. In a specific example, an IP data packet can form a single data traffic unit. When the re-ordering queue buffer is filled, the IP data packets are re-ordered based on their sequence number. As it is well known from existing IP transmission protocols, a source delivering in the network a stream of IP data packets will assign to each packet a unique sequence number to allow the machine at the endpoint that receives the IP data packets to determine if packets are missing and also to effect a final re-ordering process. As a basic rule, the IP data packets in the re-ordering queue that have the smallest sequence numbers are released from the queue first. Indeed, a convention is established to the effect that a source will assign sequence numbers to successive IP data packets in an increasing order, thus small sequence numbers designate IP data packets sent earlier than IP data packets assigned higher sequence numbers.

By holding an IP data packet in the re-ordering queue for a certain time period, IP data packets that have been delayed over slower paths are allowed to catch up. If those slower IP data packets reach the reordering queue before the earlier IP data packet is released, the re-ordering process made by the router is likely to restore the original IP data packet order.

The maximal time delay variable that determines how long an IP data packet is held in the re-ordering queue buffer can be established in different ways, namely:

a) Fixed Maximal Time Delay Variable

Under this implementation scheme, the maximal time delay variable is fixed and does not change. The selected maximal time delay variable can be set through manual configuration.

b) Adaptable Maximal Time Delay Variable

Under this implementation, an algorithm calculates the level of re-ordering accomplished by the re-ordering queue buffer. By "level of re-ordering" is meant to what extent data traffic units out of order are placed back in order. When a complete re-ordering is achieved, the data traffic units have been placed back in their original order. In some instances, however, complete re-ordering will not be achieved, only an improvement will be possible, in other words the final order of the data traffic units will have moved away from the order in which the data traffic units were received by the re-ordering queue buffer, toward their original order. How close the final order is from the original order determines the "level of re-ordering". Also note that re-ordering of the data traffic units is assessed between data traffic units that were originally from a common stream, not between data traffic units that belong to different traffic streams. On the basis of the level of re-ordering the maximal time delay variable is adjusted up or down to compensate. In one specific embodiment, when an opportunity to re-order a certain IP data packet is missed, say because an IP data packet (first packet) that should have been placed after a certain other IP data packet(second packet) was not placed in the proper position because it was not held in the re-ordering queue buffer long enough so the second packet could catch up, then the maximal time delay variable is increased to augment the residence time of the IP data packets in the re-ordering queue buffer. On the other hand, when no such missed re-ordering opportunities are observed over a certain time frame, the maximal time delay variable is decreased.

c) Maximal Time Delay Variables Assigned to Source Address Groups

This embodiment features a set of maximal time delay variables, each variable being assigned to a certain source address or to a group of source addresses. During the re-ordering operation, the source address of the IP data packet is read in the packet header and the corresponding maximal time delay variable retrieved for the processing of the IP data packet.

d) IP Data Packets Timestamping at Source of Traffic Splitting

Under this embodiment the site of the network where traffic splitting occurs adds to the data traffic units a "order stamp" that is defined as information capable of identifying the order of the packets at the traffic splitting point. Most preferably, the "order stamp" is a timestamp that provides information as to the specific time at which the IP data packet left the time splitting port of the router. When the IP data packets are received at the re-ordering site, the timestamp allows to determine from the respective times of arrival of the IP data packets the variation in propagation delay from the traffic splitting point to the re-ordering site. This propagation delay can be used to more accurately estimate the maximal time delay variable so as to keep a fine balance between a residence time for the IP data packets in the re-ordering queue buffer that is sufficiently long so the slower IP data packets can catch up and an acceptable transmission delay through the network.

As embodied and broadly described herein, the invention also provides a method for reducing a level of miss-ordering of data traffic units transmitted in a network, said method comprising the steps of:

receiving a stream of data traffic units in a potentially miss-ordered condition;

placing the data traffic units in storage medium;

altering an order of the data traffic units while in the storage medium on a basis of a first recognizable characteristic of each data traffic unit for reducing a level of miss-ordering of the data traffic units;

controlling a residence time of each data traffic unit in the storage medium;

releasing data traffic units from said re-ordering queue storage medium.

As embodied and broadly described herein, the invention further provides an apparatus for reducing a level of miss-ordering of data traffic units travelling in a certain network, said apparatus including:

an input for receiving a stream of data traffic units in a potentially miss-ordered condition;

means accumulating the data traffic units during a certain period of time in a storage medium;

means for reordering the data traffic units in the storage medium in accordance with a certain recognizable characteristic of each data traffic unit;

an output for releasing the data traffic units from the storage medium.

As embodied and broadly described herein, the invention further provides a method for reducing a level of miss-ordering of data traffic units travelling in a certain network between a source point and a destination point, said method comprising the steps of:

intercepting the data traffic units while the data traffic units travel between the source point and the destination point;

accumulating the data traffic units in a storage medium;

re-ordering the data traffic units in accordance with a certain recognizable characteristic of each data traffic unit;

releasing the data traffic units from the storage medium toward the destination point.

As embodied and broadly described herein, the invention further provides a combination, including;

a first network node, including:
  a) an input for receiving data traffic units;
  b) a traffic splitting output;

a plurality of pathways connected to said traffic splitting output, said traffic splitting output releasing data traffic units by distributing the data traffic units over said plurality of pathways;

a second network node, including:
  a) an input connected to said plurality of pathways for receiving the data traffic units released from said traffic splitting output;
  b) means for re-ordering the data traffic units received at the input of said second network node;
  c) an output;

a single pathway connected to the output of said second network node, said output releasing re-ordered data traffic units in said single pathway capable of transporting the re-ordered data traffic units in serial order, thereby preventing a change in the order of the data traffic units.

As embodied and broadly described herein, the invention further provides a traffic splitting network node, comprising:

an input for receiving data traffic unit's;

means for appending to at least some of the data traffic units a timestamp;

a traffic splitting output capable of supporting a multi-pathway link to a certain destination, said traffic splitting output releasing data traffic units by distributing the data traffic units over different pathways of said multi-pathway link, said timestamp being indicative of a time of release of an associated data traffic unit from said traffic splitting output.

DESCRIPTION OF A PREFERRED EMBODIMENT

Figure 1:
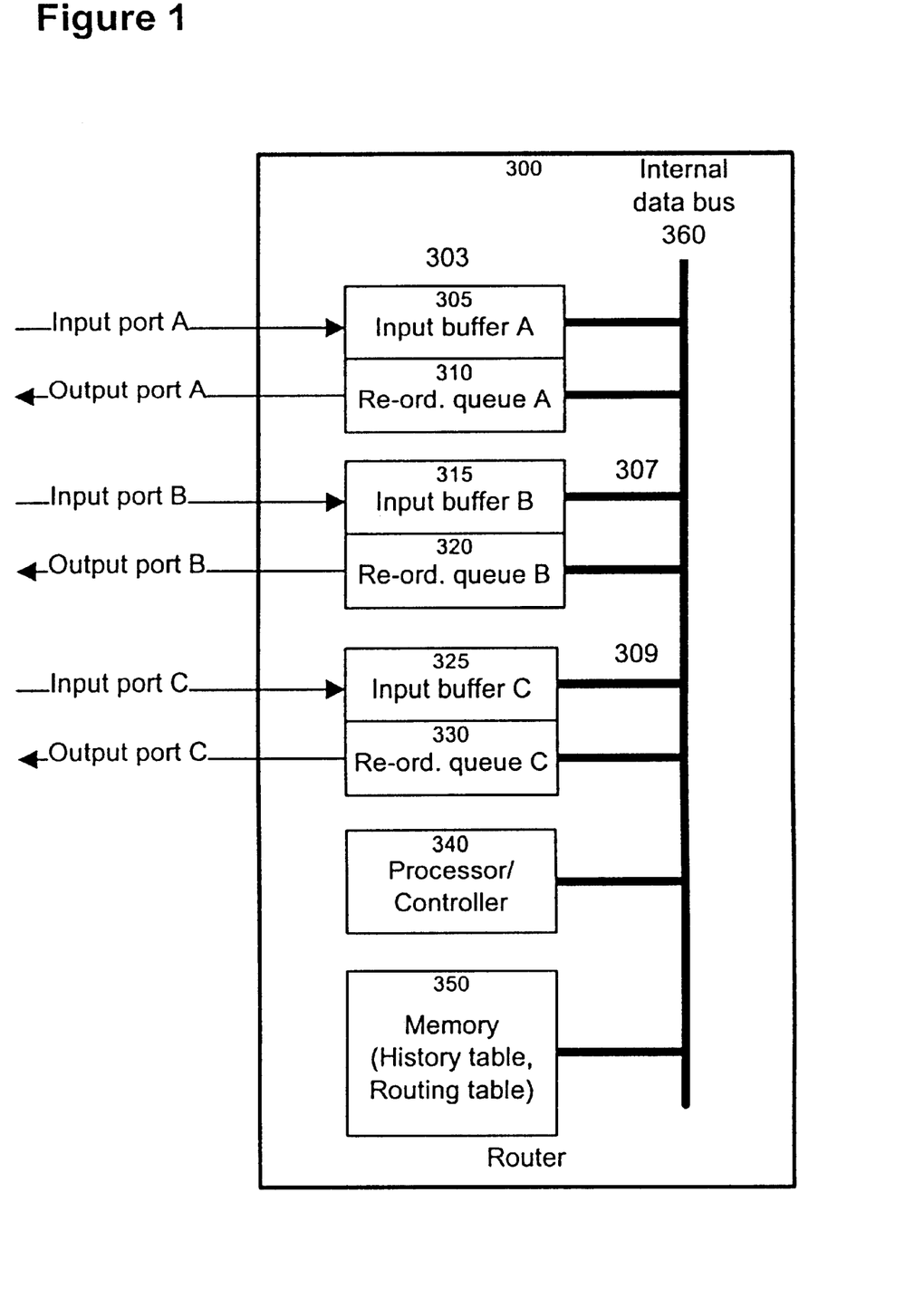
FIG. 1 is a block diagram of the structure of a router in accordance with the invention.

The structure of a router constructed in accordance with the present invention is shown in FIG. 1. The router 300 is comprised of interfaces 303, 307 and 309 that connect an internal data bus to the respective physical links A, B and C. In the example shown, each physical link supports two ports, namely an input port and an output port. Note that each physical input and output port may include a number of virtual input and output ports. The interfaces 303, 307 and 309 include input buffers 305, 315 and 325, and re-orderable queue storage media in the form of buffers 310, 320 and 330. The input buffers are memory spaces of the FIFO type that can hold input IP data packets received at the input port of the associated physical link. The purpose of the buffers is to provide a temporary storage mechanism allowing to hold the incoming IP data packets before a decision is made by the routing logic as to how those packets are to be handled. The physical configuration of the input buffers does not need to be described in detail because such components are readily available in the marketplace and the selection of the appropriate buffer mechanism suitable for use in the present invention is well within the reach of a person skilled in the art. The re-orderable queue buffers 310, 320, and 330 are designed to allow changing the order of the IP data packets stored in the respective slots of the buffers. Again, such devices are well known to those skilled in the art and they do not need to be described in detail later.

The router 300 includes an internal data bus 360 that enables transport of data and control signals between all components of the router. The memory 350 contains a program element that controls the operation of the router. That program element is comprised of individual instructions that are executed by the processor 340, as it will be described in detail below. In addition, the memory holds the usual routing table that maps the destination addresses of incoming IP data packets to the router output ports. It is not deemed necessary to further discuss the structure of the routing table here because this component is not critical for the success of the invention and also it would be well known to a person skilled in the technological field to which the present invention belongs. Finally, the memory 350 also provides a random access storage capability allowing to hold data elements that the processor 340 manipulates during the execution of the program.

The router 300 has the ability of re-ordering IP data packets that arrive at any one of the interfaces 305, 315 and 325. As mentioned earlier, miss-ordering occurs when IP data packets that are successively input in the network travel toward a certain destination over different paths. The level of miss-ordering depends primarily upon the delay differential that the IP data packets experience over the various network paths. The router 300 is capable to completely re-order the IP data packets or at least to reduce the level of miss-ordering by first delaying the IP data packets so that IP data packets that are late can catch up with IP data packets that have arrived earlier and then, by changing the order of the IP data packets in an attempt to restore their original order. When the re-ordering operation has been completed, the IP data packets are released through an output port of the router 300.

In the example shown at FIG. 1, the re-ordering operation implemented by the router 300 can be effected in any one of the re-ordering queue buffers 310, 320 and 330. Assume for the sake of the discussion that a certain IP data packet arrives at the router 300 at the input port of interface 309 connected to the physical link C. The IP data packet is placed in the input buffer 325 and the routing logic invoked to determine toward which output port the IP data packet is to he transported. This is effected by reading the destination address field in the IP data packet header and then scanning the routing table to determine the output port assigned to this destination address. In this case the selected output port is connected to the physical link A. The IP data packet is then transferred from the input buffer 325 to the re-ordering queue buffer 310 over the data/control bus 360. A re-ordering operation is then effected to determine from the group of IP data packets held in the re-ordering queue buffer 310, the IP data packet that is to be sent over the output port A.

Figure 7:
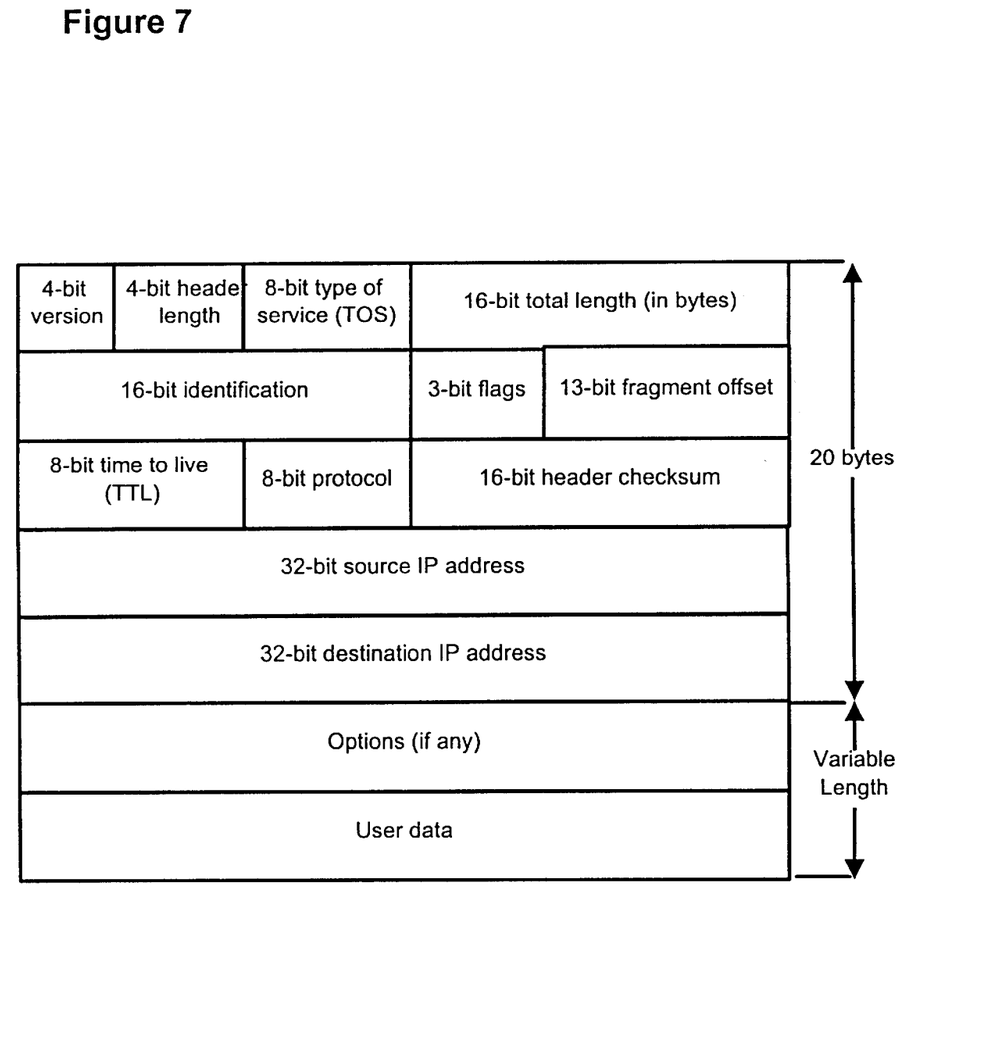
FIG. 7 is a diagram showing the format of an ID data packet.

The re-ordering operation is effected on the basis of the sequence number in the header of the IP data packet. FIG. 7 shows the format of an IP data packet. Normally, the IP data packet has a header of 20 bytes (unless options are present). The header contains a 16 bit identification field. This identification field is provided to hold a sequence number that is provided by the originating host for each packet sent. By inspecting this field, it is possible to tell whether one packet was sent before another.

The traffic arriving at the input port C will be from many clients (sources), each having its own identification sequence. In this case, the re-ordering process does not distinguish between the sources. Objectively this method may not guarantee complete re-ordering primarily because the re-ordering logic will look only at sequence numbers, without taking into account the sources. Also, since each source has its own numbering sequence, and since lowest numbered packets are sent first, it is possible, in high load conditions, for a high numbered packet from one source to be consistently delayed behind lower number packets from others sources. Also, wrap around of the numbering in the identification field will occasionally cause this problem. Notwithstanding those drawbacks, this method will reduce the level of miss-ordering particularly when clusters of IP data packets coming from one source are being processed in the re-ordering queue buffer.

The order with which IP data packets are released from the re-ordering queue is also determined by a time delay element. Such time delay element is desirable so as to enable slower IP data packets to catch up to IP data packets that have reached the re-ordering queue earlier. In the interest of performance, however, such time delay element should be as small as possible so as to avoid introducing unnecessary delays in the data propagation through the network. Several possibilities exist to compute the time delay element, that will be discussed in detail later.

Figure 2:
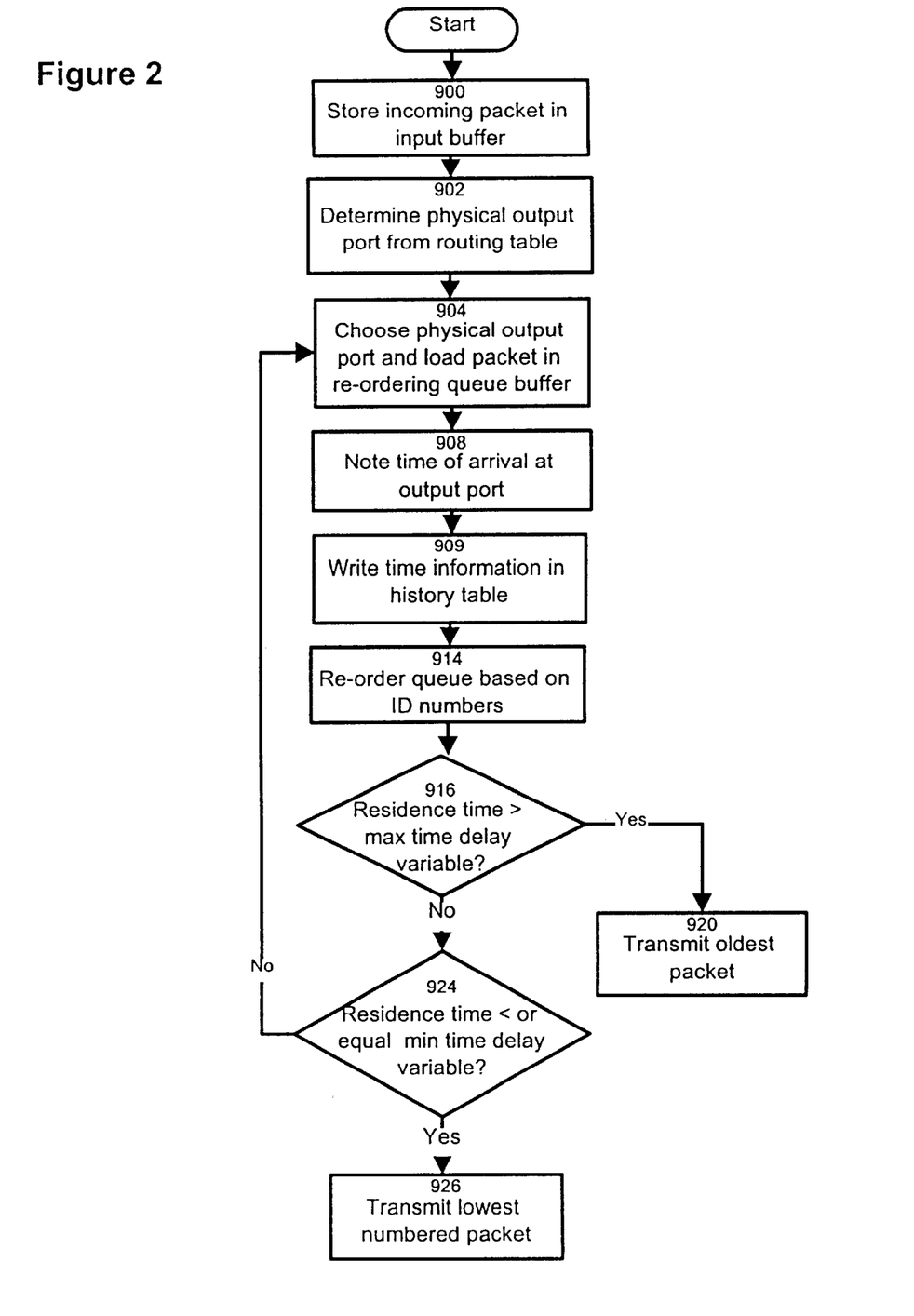
FIG. 2 is a flow chart illustrating the operation of a program element in the router depicted at FIG. 1 that controls the re-ordering of the packets received by the router.

FIG. 2 provides a complete flowchart illustrating the operation of the program element stored in the memory 350 and executed by the processor/controller 340 that regulated the operation of the router 300, including the management of the re-ordering queues 310, 320 and 330 particularly for reducing the degree of miss-ordering of the IP data packets stored in any one of those queues. At step 900 an IP data packet is received by the router. Continuing with the above example, assume that the IP data packet is received at the input port of interface 309. The IP data packet is placed in the input buffer 325 and then control is passed to the routing logic of the program as illustrated by step 902. The routing logic reads the destination address of the IP data packet and consults the routing table. The table indicates the address of the output port through which the IP data packet is to be dispatched so as to reach the desired destination. At step 904 the IP data packet is transferred to the re-ordering queue buffer 310 associated with the physical link A. At step 908 the time of arrival of the IP data packet at the re-ordering queue buffer 310 is noted. This can be effected by simply entering in a history table (step 909) depicted in FIG. 3 time of arrival information relative to the IP data packet. In this specific example, the history table has three fields, namely a source address field, a sequence number field and a time of arrival field. For each IP data packet received at the re-ordering queue buffer 310 the program element creates an entry in the table. That entry is made by reading the source address information and the sequence number information from the IP data packet header and simply writing this data into the respective fields of the table. Also the time of arrival is entered in the table to complete the record. The time of arrival is obtained from the system clock, not shown in the drawings.

At step 914 the program element re-orders the queue buffer 310 based solely on ID numbers of the individual IP data packets. Such ordering is done in decreasing order to keep the IP data packets having the lowest sequence numbers at the bottom of the queue that constitutes the egress point of the queue (IP data packets are taken for the bottom of the queue and placed over the physical link A for transmission while IP data packets loaded in the queue are entered from the top of the queue). Next, the program element inspects the time of arrival of each IP data packet held in the queue and compares that time of arrival value against a maximal time delay variable. In essence, the program element reads for each IP data packet the time of arrival value stored in the history table depicted at FIG. 3 and calculates a residence time value based on the current time (residence time=current time−time of arrival). At step 916 the residence time is compared against a maximal time delay variable permitted. If any one of the IP data packets held in the reordering queue buffer 310 have exceeded the maximal time delay variable, they are taken out from the re-ordering queue and transmitted over the physical link A. This transmission is effected without regard to the ID sequence numbers. As mentioned earlier, the maximal time delay variable establishes for how long a certain IP data packet can be held in the re-ordering queue so that slower IP data packets can catch-up. If this time delay is exceeded, however, the IP data packet is released, as depicted at step 920, otherwise the IP data packet could be unduly retarded.

Another time delay variable can also be used to control the residence time of the IP data packets in the re-ordering queue 310. This is a minimal time delay variable that establishes a minimum residence time for each IP data packet in the re ordering queue before that packet is released. The minimum time delay variable is less than the maximum time delay variable. The minimum time delay variable can be chosen in accordance with the level of packet re-ordering desired on one hand and the latency of the IP data packet in the router on the other hand. Increasing the minimum time delay variable will hold the IP data packets in the re-ordering queue longer, thus augmenting the possibility that slower IP data packets can catch-up and be placed in the correct order. A longer minimal time delay variable, however, augments the latency of the IP data packet. Thus the choice of the appropriate minimal time delay variable is a question of balance between the desired latency and how powerful the IP data packet re-ordering capability should be. Step 924 compares the residence time of the IP data packet having the lowest sequence number with the minimal time delay variable. If that IP data packet exceeds the minimal time delay variable it is sent over the physical link A. Otherwise, the program element returns back to step 904 where another IP data packet is loaded in the re-ordering queue.

In some instances, IP data packets may have the same identification number. For example, packets from different sources may coincidentally have the same number and packets which form part of a fragmented packet from one source may also have the same sequence number. If IP data packets are encountered that have the same identification number an arbitrary choice is made during the re-ordering process as to which packet is placed first.

Several possibilities exist to compute the maximum time delay variable. Those possibilities are discussed below.

a) Fixed Maximum Time Delay Variable

Under this implementation scheme, the maximal time delay variable is fixed and does not change during the operation of the router. The selected maximal time delay variable can be set through manual configuration. No changes are required to the IP packets and the re-ordering strategy can be applied at any node in the network to re-order streams that have suffered misordering by taking any multiple paths in the network. However, it has certain limitations. Firstly, it will always delay all packets by the amount necessary to restore order to the stream with the worst differential path delay. Secondly, it has no information to tell it whether a packet is part of a stream that has misordered packets and thirdly, it does not distinguish between streams that arrive from different routes and experience different amounts of differential delay.

b) Adaptable Maximum Time Delay Variable

Figure 3:
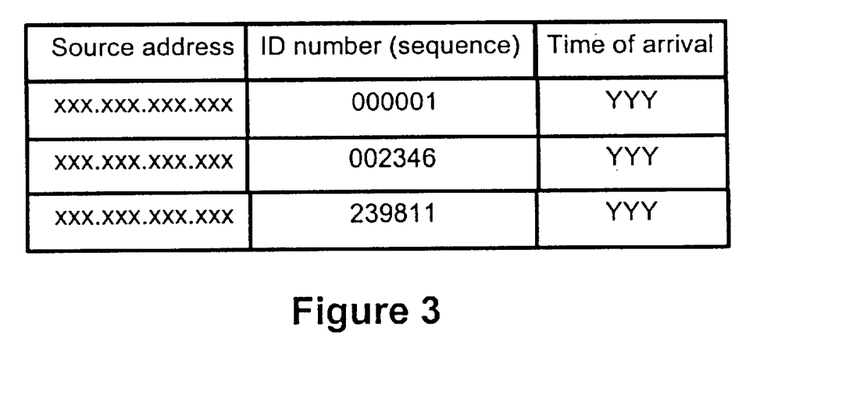
FIG. 3 illustrates the structure of a history table.
Figure 4:
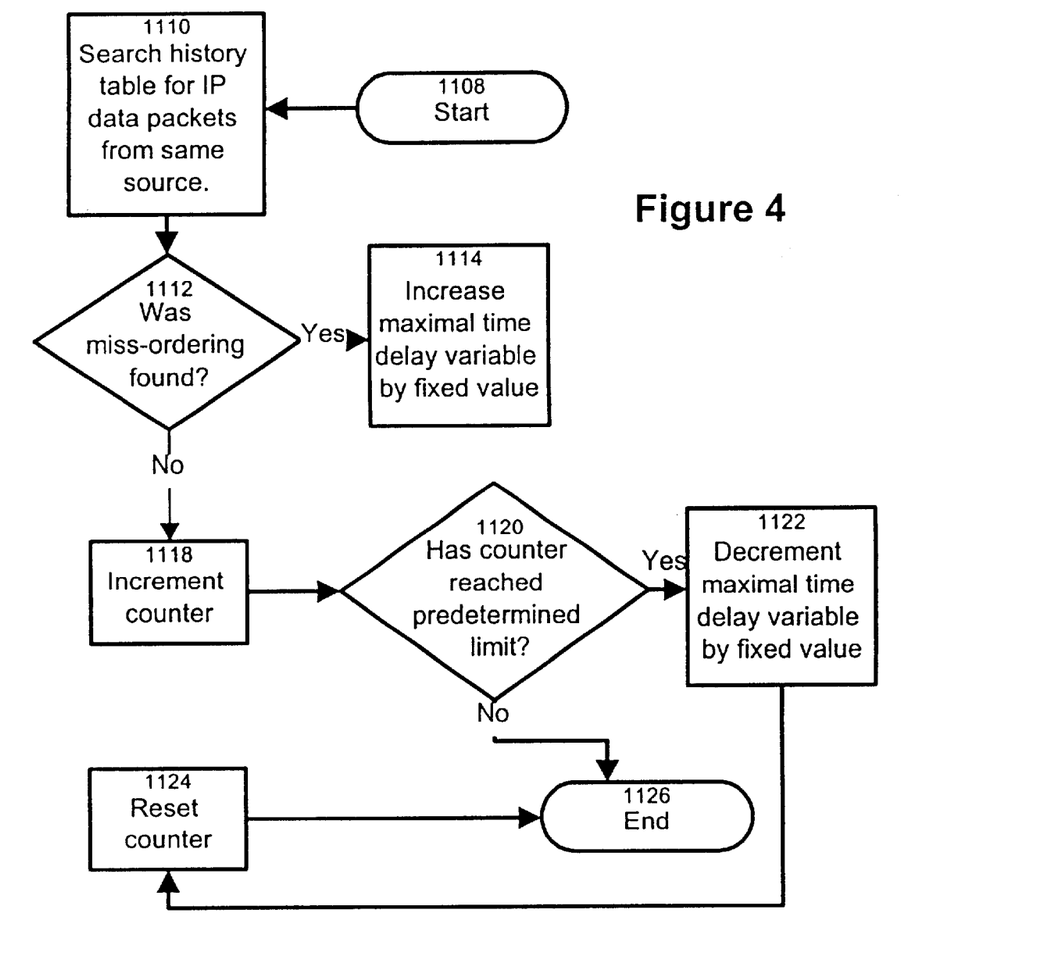
FIG. 4 is flow chart of an algorithm implemented by the router in accordance with the present invention to vary the duration of the maximal time delay variable.

Under this implementation an algorithm built into the program element managing the operation of the router 300 observes the entries in the history table shown at FIG. 3 to determine whether the maximum time delay variable should be increased or decreased. The algorithm operates according to the flow chart at FIG. 4. At step 1108 the operation is started. In a specific example, this function can be invoked every time a new IP data packet is loaded in the re-ordering queue. At step 1110 the history table is being searched to extract the entries having the same source address. Those entries are then re-ordered on the basis of the sequence number. The entries found and re-ordered are then compared to the IP data packet loaded in the re-ordering queue buffer to determine if misordering exists, as illustrated at conditional step 1112. Stated otherwise, the system will look for sequence numbers in the entries selected from the history table that are higher than the sequence number of the IP data packet just loaded in the re-ordering queue buffer. If any higher sequence number entries are found, the system assumes that misordering has occurred since those higher sequence number entries should have been sent out after the current IP data packet loaded in the re-ordering queue buffer. Thus, if the conditional step 1112 is answered in the positive, the maximal time delay variable is incremented by a fixed value, that can be large or small depending upon the granularity of the control desired. If no misordering has occurred, then a counter is incremented at 1118. When the counter reaches a certain limit, say 1000, the maximal time delay variable is decremented by a fixed step (step 1122). Again the fixed step is manually set and can be chosen large or small depending upon the granularity of the control desired. Once a downward maximal time delay re-adjustment has occurred the timer is re-set as illustrated at step 124. Returning back to step 1120, when the counter has not yet reached the limit, the maximal time delay variable is not changed.

In order to keep the size of the history table reasonable, entries can be aged out after a certain period.

c) Maximal Time Delay Variables Assigned to Source Address Groups

In order to avoid having all packets suffer the worst case delay, IP data packets from a particular source may be assigned to one of a number of maximal time delay variables. This strategy can be implemented at the level of step 916 of the flow chart depicted at FIG. 2. When comparing the residence time for each IP data packet in the re-ordering queue, the program element instead of utilizing a single maximal time delay variable, selects one variable in a given set. The selection is made on the basis of the source address. Thus, the maximal time delay variables are assigned to different sources. Each maximal time delay variable from the set is assigned a certain source address. Before effecting the comparison at step 916, the set of maximal time delay variables is searched to locate the one matching the source address of the IP data packet that is currently being processed. The maximal time delay variable found is then loaded for the comparison operation to be completed. The assignment of the maximal time delay variables with relation to the source addresses can be done in various ways. For instance, there may be a single maximal time delay variable per source address. Another possibility is to provide maximal time delay variables assigned to source address groups.

Another possibility is to make the various maximal time delay variables adaptable by using the strategy described earlier. Such adaptability could be independent from one maximal time delay variable to another.

d) IP Data Packet Timestamping at Source of Miss-Ordering

This strategy is the most complex, however, it allows to accurately determine the maximal time delay variable. In short, a timestamp is placed in the header of the IP data packet at the source. This timestamp can then be read at the site where the reordering information is to be performed to estimate the delay suffered by the IP data packet on a particular pathway through the network.

Figure 5:
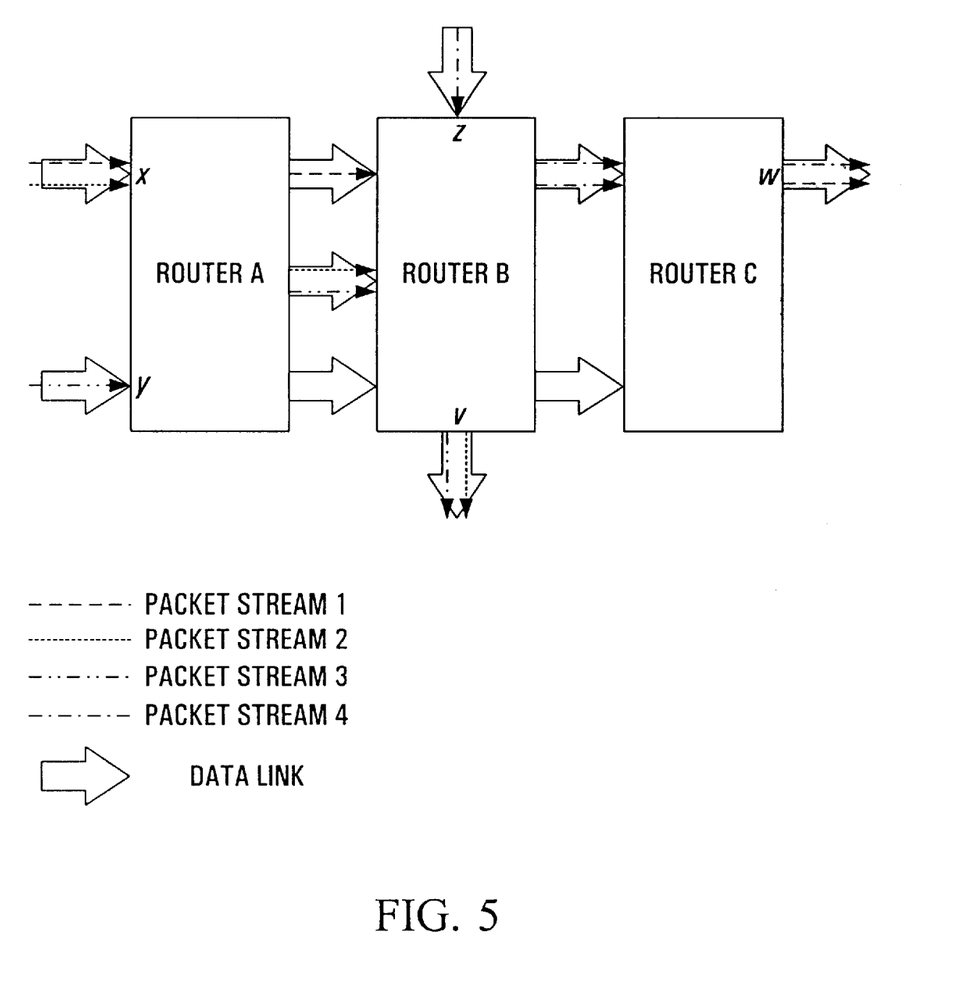
FIG. 5 is a block diagram showing a network of three routers.
Figure 6:
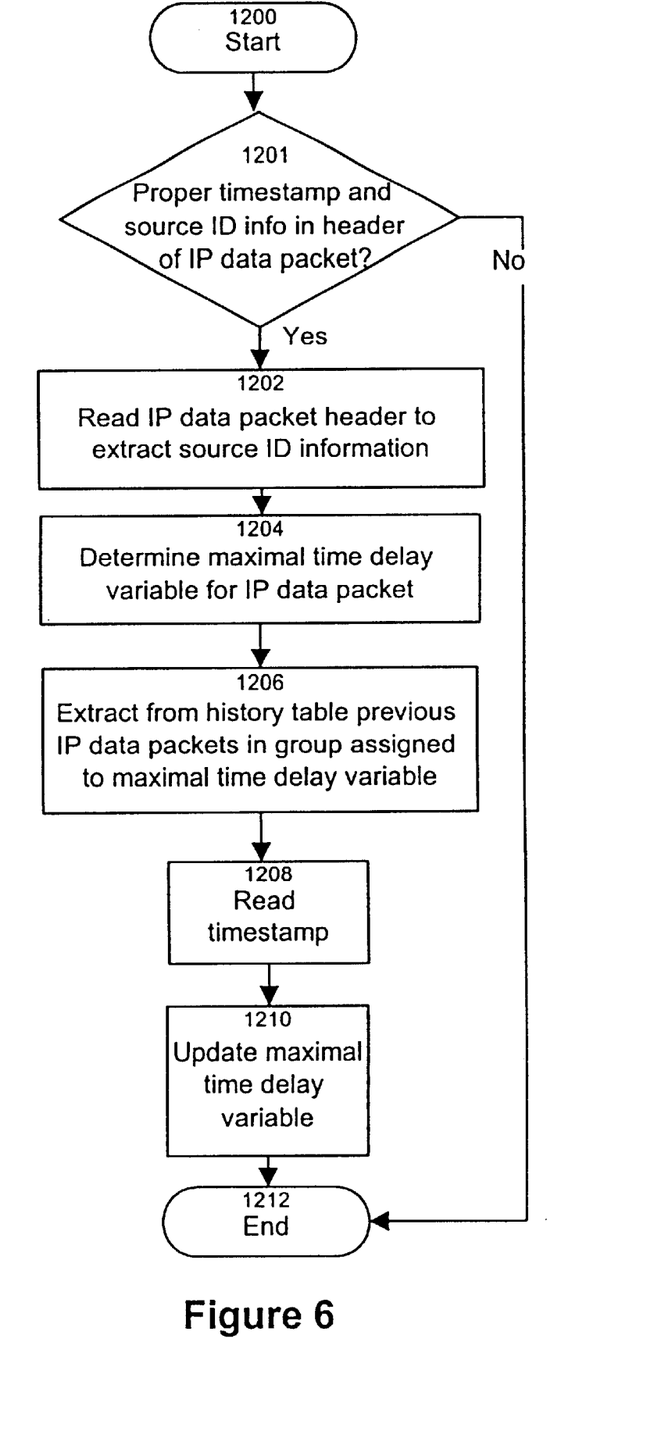
FIG. 6 is a flow chart of a procedure for computing the maximal time delay variable.

FIG. 5 shows a network of three routers A, B and C that can implement the IP data packet timestamping feature. Between routers A and B is a three link supertrunk and between routers B and C is a two link supertrunk. Packet stream 1 is shown flowing from the source port x on router A through router B to destination port w on router C. Packet stream 2 is shown flowing from the source port x on router A to destination port v on router B. Packet stream 3 is shown flowing from the source port y on router A to destination port v on router B. Finally, packet stream 4 is shown flowing from source port z on router B to destination port w on router C. The three-link supertrunk connection between the routers A and B and the two-link supertrunk connection between routers B and C defines a multi-path network between the input port X and the destination port W. Thus, during the operation of the system, IP data packets serially input at source port X may be assigned different paths toward destination port W. The order of those IP data packets may be altered as a result of different propagation delays over the various pathways. For the purpose of the present example assume that the re-ordering of the IP data packets is effected at router C, before the IP data packets are released from the destination port W. Here, router A acts as a source, releasing IP data packets and placing in each IP data packet a timestamp that it allows the destination at which re-ordering of the IP data packet packets is effected (router C) to estimate the propagation delay and thus, more accurately control the maximum time delay variable used to control the residence time of the IP data packets in that re-ordering queue buffers.

Figure 9:
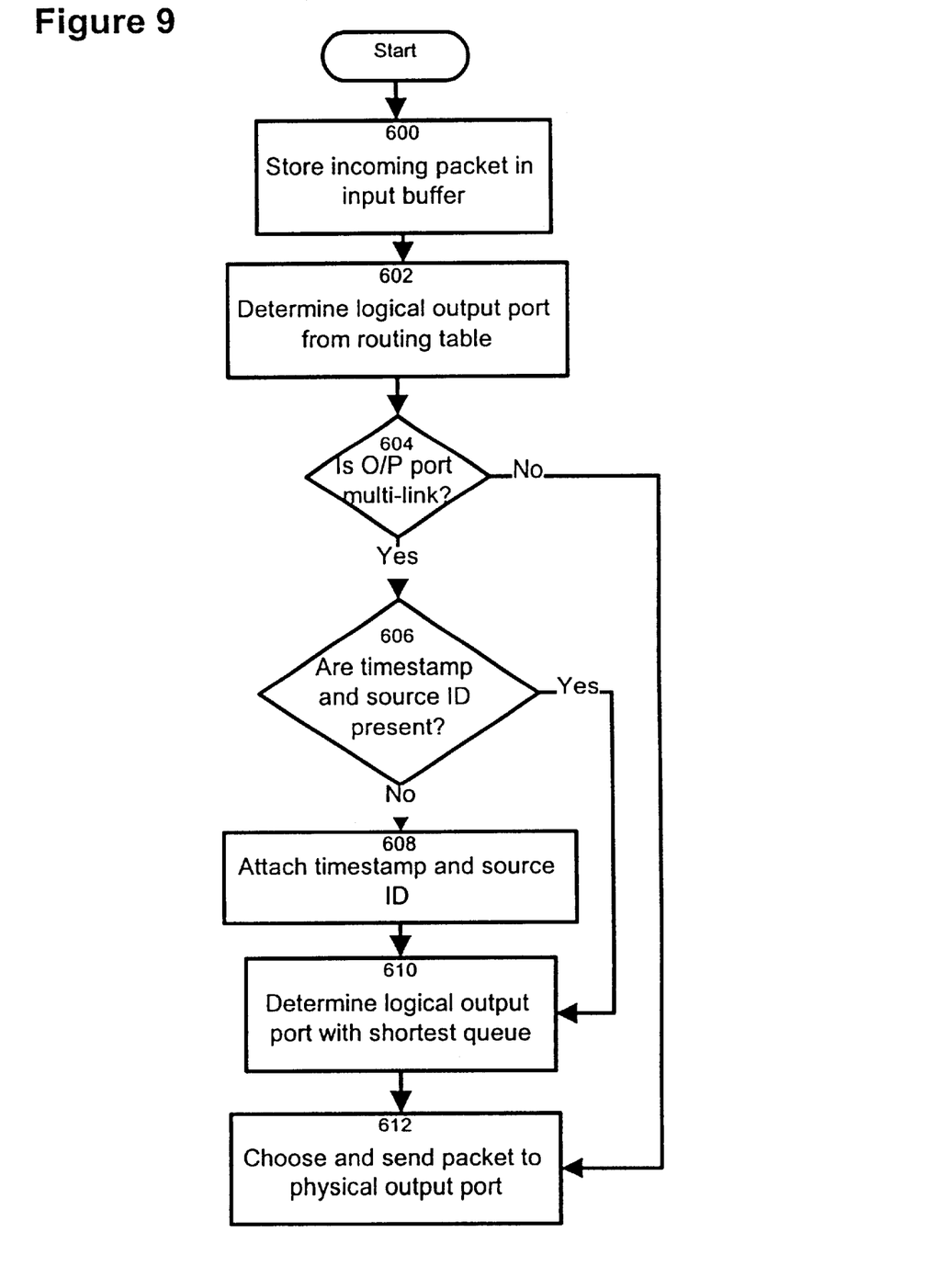
FIG. 9 is a flow chart of a procedure for appending a timestamp to the header of an IP data packet.

Structurally speaking, the router A is very similar to the router 300 earlier described. More specifically, the router A includes a plurality of interfaces connected to respective physical links, a processor/controller, a memory and a data bus interconnecting the various components of the router A. A characterizing feature of the router A is that one of its interfaces terminates on a logical output port, in other words a port that is constituted by a plurality of physical links. A program element designed to attach the timestamp to the incoming IP data packets resides in the memory of the router A and that program element is executed by the processor/controller of the router A. FIG. 9 is a flowchart illustrating the operation of this program element. At step 600, an incoming IP data packet is received at an input port of the router A. At step 602, the routing table is read to determine through which output port the IP data packet should be released. If that output port is a logical output port (multi-link), that implies traffic splitting, a special procedure is followed to embed in the IP data packet information indicative as to the time at which the traffic splitting has occurred. More specifically, at step 606, the program element will inspect the header of the IP data packet to determine if the options field (please refer to FIG. 7) is empty or if it contains some information. If that field is empty, the program elements first writes data indicative of the absolute time as provided by the system clock of the router A and also it places the source address of the router A. These two elements of information therefore indicate the time at which traffic splitting has occurred and the location in the network where the traffic splitting has been effected. At step 610 the physical link supported by the logical output port is determined based on load balancing algorithms well known in the art that do not need to be described here because they are not critical to the success of the invention. Suffice it to say that once the IP data packet has reached the logical output port it may leave the router A over any one of a number of physical links supported by the logical output port. This is the actual location in the network where traffic splitting occurs.

Returning back to conditional step 606, if this step is answered in the affirmative for the reason that the IP data packet options field already contains some information, the step 608 is bypassed and no change is made to the IP data packet header. This provides a transparency of operation allowing to preserve the timestamp or any other information written in the options field that may have been placed by an earlier source, If conditional step 604 is answered in the negative to indicate that the output port supports a single physical link where no traffic splitting is susceptible to occur, the entire timestamping procedure is bypassed and no change is made to the IP data packet header. The IP data packet is simply forwarded to the selected output port and released from the router A.

Figure 8:
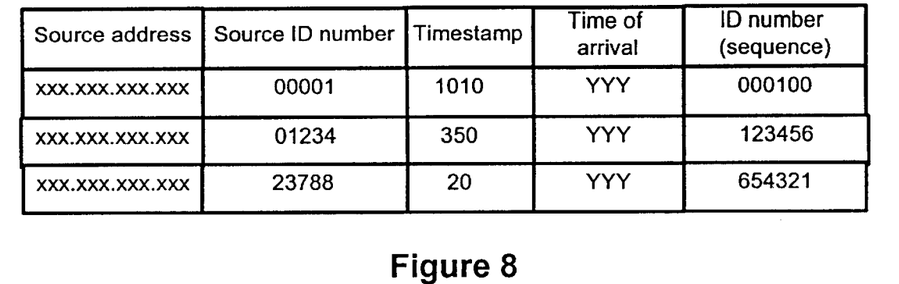
FIG. 8 is illustrates the structure of a modified history table.

When router C receives the timestamped IP data packets it implements a re-ordering procedure similar to the one depicted. This modified re-ordering procedure is designed to assign maximum time delay variables to source addresses (as embedded by a source in the options field of the IP data packet header), and also to use the timestamp information so as to provide a more accurate estimation of the maximum time delay variable. The flow chart of the algorithm that is implemented by the program element managing the operation of the router C is depicted in FIG. 9. This algorithm is invoked when step 916 is reached in the re-ordering procedure (as depicted in FIG. 2). Control is then passed to step 1201 where the header of the IP data packet is read to find out if an information is contained in the options field. If no information is found that means that no timestamp nor source ID info exists for this IP data packet, the entire procedure is bypassed and a default maximal time delay variable is applied to this IP data packet. If the options field is not empty but contains data in a format other than what is expected, the same steps are followed. On the other hand if information with the proper format is found in the header of the IP data packet, the source ID information is read at step 1202 and the associated maximal time delay variable found at step 1204. Next, at step 1206 the history table is consulted and all the prior entries associated with the source ID number in the IP data packet header are extracted. The history table is somewhat different from the one depicted in FIG. 3 and applicable to the operation of the router 300. The structure of the modified history table is shown at FIG. 8. This table features two additional fields, one for holding the timestamp for each entry, and one for holding the source ID information. It should be noted that the source ID information is different from the source address. The latter is the IP address of the source that has originally constructed and released the IP data packet in the network. On the other hand, the source ID information is an arbitrary identifier that is assigned to the entity in the network at which traffic splitting can occur. Here, the intent is to be able to identify where in the network traffic splitting has occurred, irrespective from where the IP data packet originates. Also note that the time delay variables available are associated with source ID information, rather than source address as per embodiment C above. The association between source ID number and corresponding maximal time delay variables may be effected in a data structure in the form of a table, one column of the table holding the maximal time delay variables and the other column holding the associated source ID numbers. The source ID number can be assigned in as coarse or as granular fashion as desired. For instance, every port in a network where traffic splitting is susceptible to occur could have a separate identity. More likely, each router (that may implement several traffic splitting ports) could have a separate identity but the identity could also extend to arbitrarily large groups.

Locating the maximal time delay variable is effected by searching this data structure to locate the record matching the source ID number and extracting the corresponding maximal time delay variable applicable.

At step 1208 the timestamp in the IP data packet header is read. Next, an updated maximal time delay variable is calculated, at step 1210. A processing is done on all IP data packets (the current one and the ones previously received by the router C) Thins processing includes the normalization of the timestamps in the IP data packet headers and assessment of a new maximal time delay variable. The system chooses the oldest packet (as indicated by the time of arrival info in the history table) as a common zero reference and then calculates a relative delay for the IP data packets that have followed. The following table is an example of such history:

| Timestamp (ms) | | Time of arrival (ms) | | Difference (ms) |
| --- | --- | --- | --- | --- |
| Actual | Normalized | Actual | Normalized | |
| 100 | 0 | 1010 | 0 | 0 |
| 120 | 20 | 1060 | 50 | −30 |
| 150 | 50 | 1020 | 10 | 40 |
| 200 | 100 | 1080 | 70 | 30 |

It can be seen that the spread of relative delays is from −30 to 40 which suggests a delay differential of 70 ms. This delay is the variation in time for an IP data packet to travel from the traffic splitting point to the router C. The most current IP data packet is then used to update the delay spread value. Once the new delay spread is computed a new maximal time delay variable is calculated. If one needs a very robust re-ordering function, the maximal time delay variable can be set to the delay spread. For applications where less robustness can be tolerated but where higher transmission speed is important, then the maximal time delay variable can be less.

In a possible variant, the router C can be provided with interfaces featuring several re-ordering queue buffers, there being one buffer per possible source address ID number. The implementation of this feature requires a functional element in the program that reads the source ID number of each IP data packet and loads this IP data packet in the appropriate queue. This feature is advantageous in that the ordering on the basis of sequence number permits to provide a more definitive re-ordering. By using a single queue re-ordering is effected on the basis of sequence number but without taking into account the source. This may result in some wasted steps where changes in the order of the queue are made on the basis of sequence number of IP data packets from different sources as such re-ordering does nothing to restore the original order of packets from the same source. It should be noted that the multiple reordering queue arrangement can also be used with the other embodiments presented here to calculate the maximal time delay variable.

The above description of a preferred embodiment under the present invention should not be read in a limitative manner as refinements and variations are possible without departing from the spirit of the invention. The scope of the invention is defined in the appended claims and their equivalents.

We claim:

1. An apparatus for manipulating data traffic units transmitted in a network to reduce a level of miss-ordering of the data traffic units, said apparatus comprising:
   a) an input for receiving a stream of data traffic units in a potentially miss-ordered condition, each data traffic unit being associated to a respective sequence number;
   b) a re-ordering queue for receiving the data traffic units;
   c) a processing unit in an operative relationship with said re-ordering queue, said processing unit is operative for:
      i) reordering the data traffic units in the re-ordering queue on a basis of the sequence number of each data traffic Unit for reducing a level of miss-ordering of the data traffic units;
      ii) applying to the data traffic units in the re-ordering queue a first selection operation, the first selection operation being characterized by a minimal time delay variable that defines a minimal residence time of a data traffic unit prior to release of the data traffic unit from said re-ordering queue, the first selection operation being applied to locate a potential data traffic unit having a sequence number indicating that the data traffic unit precedes all the other data traffic units in said re-ordering queue and having a residence time exceeding the minimal time delay variable;
      iii) applying to the data traffic units in the re-ordering queue a second selection operation, the second selection operation being characterized by a maximal time delay variable that defines a maximal residence time of a data traffic unit prior to release of the data traffic unit from said re-ordering queue, the second selection operation being applied to locate a potential data traffic unit having a residence time exceeding the maximal time delay variable irrespective of the sequence number of the data traffic unit;
   d) an output for releasing data traffic units located by the either one of the first and the second selection operations.

2. An apparatus as defined in claim 1, wherein said processing unit is further operative for increasing the value of the maximal time delay variable.

3. An apparatus as defined in claim 2, wherein said processing unit is further operative for:
   a) identifying a missed opportunity in a re-ordering operation of said re-ordering queue to reduce a level of miss-ordering between data traffic units;
   b) increasing said maximal time delay variable when a missed opportunity is identified in a).

4. An apparatus as defined in claim 2, wherein said processing unit is further operative for decreasing the value of the maximal time delay variable.

5. An apparatus as defined in claim 4, wherein said processing unit decreases the value of the maximal time delay variable when no missed opportunity of re-ordering is identified during a certain number of data traffic units re-ordering events.

6. An apparatus as defined in claim 1, wherein said processing unit is operative for assessing a variation in delays for propagating data traffic units traveling toward said apparatus over different pathways.

7. An apparatus as defined in claim 6, wherein each data traffic unit is associated to a respective timestamp, each timestamp being indicative of a time data element assigned by a traffic splitting source in a network, said processing unit being operative for:
   a) recording for each data traffic unit a time of arrival;
   b) reading the timestamp in each data traffic unit;
   c) processing for each data traffic unit the time stamp and the recorded time of arrival to compute the variation in delays for propagating data traffic units traveling over different pathways.

8. An apparatus as defined in claim 1, wherein each data traffic unit is associated to a respective address data element, each address data element being indicative of a traffic splitting source in a network through which the data traffic unit has traveled, said apparatus further comprising a set of maximal time delay variables, each maximal time delay variable being associated to a respective address data element thereby allowing a given maximal time delay variable to be associated to a data traffic unit on the basis of said address data element.

9. An apparatus as defined in claim 1, wherein each data traffic unit constitutes an IP data packet.

10. An apparatus as defined in claim 9, wherein each data traffic unit is associated to a respective address data element, each address data element being indicative of a traffic splitting source in a network through which the data traffic unit has traveled.

11. An apparatus as defined in claim 1, wherein said re-ordering queue includes a buffer.

12. A method for manipulating data traffic units transmitted in a network to reduce a level of miss-ordering of the data traffic units, said method comprising:
   a) receiving a stream of data traffic units in a potentially miss-ordered condition, each data traffic unit being associated to a respective sequence number;
   b) placing the data traffic units in a re-ordering queue;
   c) re-ordering the data traffic units in the re-ordering queue on a basis of the sequence number of each data traffic unit for reducing a level of miss-ordering of the data traffic units;
   d) applying to the data traffic units in the re-ordering queue a first selection operation, the first selection operation being characterized by a minimal time delay variable that defines a minimal residence time of a data traffic unit prior to release of the data traffic unit from said re-ordering queue, the first selection operation being applied to locate a potential data traffic unit having a sequence number indicating that the data traffic unit precedes all the other data traffic units in said re-ordering queue and having a residence time exceeding the minimal time delay variable;
   e) applying to the data traffic units in the re-ordering queue a second selection operation, the second selection operation being characterized by a maximal time delay variable that defines a maximal residence time of a data traffic unit prior to release of the data traffic unit from said re-ordering queue, the second selection operation being applied to locate a potential data traffic unit having a residence time exceeding the maximal time delay variable irrespective of the sequence number of the data traffic unit;
   f) releasing data traffic units located by the either one of the first and the second selection operations.

13. A method as defined in claim 12, said method further comprising:
   a) identifying a missed opportunity in a re-ordering operation of said re-ordering queue to reduce a level of miss-ordering between data traffic units;
   b) increasing said maximal time delay variable when a missed opportunity is identified in a).

14. A method as defined in claim 13, said method further comprising decreasing the value of the maximal time delay variable when no missed opportunity of re-ordering is identified during a certain number of data traffic units re-ordering operations.

15. A method as defined in claim 12, said method further comprising assessing a variation in delays for propagating data traffic units traveling over different pathways.

16. A method as defined in claim 15, wherein each data traffic unit is associated to a respective timestamp, each timestamp being indicative of a time data element assigned by a traffic splitting source in a network, said method further comprising:
   a) recording for each data traffic unit a time of arrival;
   b) reading the timestamp in each data traffic unit;
   c) processing for each data traffic unit the time stamp and the recorded time of arrival to compute the variation in delays for propagating data traffic units traveling over different pathways.

17. A method as defined in claim 12, wherein each data traffic unit is associated to a respective address data element, each address data element being indicative of a traffic splitting source in a network through which the data traffic unit has traveled, said method further comprising providing a set of maximal time delay variables, each maximal time delay variable being associated to a respecti e address data element thereby allowing a given maximal time delay variable to be associated to a data traffic unit on the basis of said address data element.

18. A method as defined in claim 12, wherein each data traffic unit is associated to a respective address data element, each address data element being indicative of a traffic splitting source in a network through which the data traffic unit has traveled.

19. A computer readable storage medium including a program element suitable for execution by a computing apparatus for manipulating data traffic units transmitted in a network to reduce a level of miss-ordering of the data traffic units, said computing apparatus comprising:
   a) a memory unit for storing a re-ordering queue for receiving the data traffic units;
   b) a processor operatively connected to said memory unit, said program element when executing on said processor being operative for implementing:
      i) an input for receiving a stream of data traffic units in a potentially miss-ordered condition, each data traffic unit being associated to a respective sequence number;
      ii) a re-ordering module for re-ordering the data traffic units in the re-ordering queue on a basis of the sequence number of each data traffic unit for reducing a level of miss-ordering of the data traffic units;
      iii) a selector module for:
         (i) applying to the data traffic units in the re-ordering queue a first selection operation, the first selection operation being characterized by a minimal time delay variable that defines a minimal residence time of a data traffic unit prior to release of the data traffic unit from said re-ordering queue, the first selection operation being applied to locate a potential data traffic unit having a sequence number indicating that the data traffic unit precedes all the other data traffic units in said re-ordering queue and having a residence time exceeding the minimal time delay variable;
         (ii) applying to the data traffic units in the re-ordering queue a second selection operation, the second selection operation being characterized by a maximal time delay variable that defines a maximal residence time of a data traffic unit prior to release of the data traffic unit from said re-ordering queue, the second selection operation being applied to locate a potential data traffic unit having a residence time exceeding the maximal time delay variable irrespective of the sequence number of the data traffic unit;

iv) an output for releasing data traffic units located by the selector module.

20. An apparatus for manipulating data traffic units transmitted in a network to reduce a level of miss-ordering of the data traffic units, said apparatus comprising:

a) means for receiving a stream of data traffic units in a potentially miss-ordered condition, each data traffic unit being associated to a respective sequence number;

b) means for storing the data traffic units;

c) means for re-ordering the data traffic units in the storing means on a basis of the sequence number of each data traffic unit for reducing a level of miss-ordering of the data traffic units;

d) means for applying to the data traffic units in the storing means a first selection operation, the first selection operation being characterized by a minimal time delay variable that defines a minimal residence time of a data traffic unit prior to release of the data traffic unit from said storing means, the first selection operation being applied to locate a potential data traffic unit having a sequence number indicating that the data traffic unit precedes all the other data traffic units in said string means and having a residence time exceeding the minimal time delay variable;

e) means for applying to the data traffic units in the storing means a second selection operation, the second selection operation being characterized by a maximal time delay variable that defines a maximal residence time of a data traffic unit prior to release of the data traffic unit from said storing means, the second selection operation being applied to locate a potential data traffic unit having a residence time exceeding the maximal time delay variable irrespective of the sequence number of the data traffic unit;

f) means for releasing data traffic units located by the either one of the first and the second selection operations.

* * * * *